United States Patent [19]

Kuo et al.

[11] Patent Number: 5,374,597

[45] Date of Patent: Dec. 20, 1994

[54] VANADIUM BASED OLEFIN POLYMERIZATION CATALYST

[75] Inventors: Chi-I Kuo, Humble, Tex.; Michael W. Lynch, West Chester, Ohio

[73] Assignee: Quantum Chemical Corporation, Cincinnati, Ohio

[21] Appl. No.: 17,121

[22] Filed: Feb. 12, 1993

[51] Int. Cl.$^5$ ............................ C08F 4/64; B01J 31/14
[52] U.S. Cl. .................................... 502/108; 502/109; 502/113; 502/118; 502/121; 502/131; 502/152; 502/154; 526/158
[58] Field of Search ............... 502/108, 109, 113, 118, 502/128, 131, 152, 154

[56] References Cited

U.S. PATENT DOCUMENTS

| | | |
|---|---|---|
| 2,919,265 | 12/1959 | Brooks . |
| 3,029,231 | 4/1962 | van Amerongen . |
| 3,030,350 | 4/1962 | de Jong et al. . |
| 3,051,690 | 8/1962 | Vandenberg . |
| 3,058,963 | 10/1962 | Vandenberg . |
| 3,144,473 | 8/1964 | Boor, Jr. et al. . |
| 3,168,484 | 2/1965 | Engel et al. . |
| 3,218,266 | 11/1965 | Ludlum . |
| 3,231,515 | 1/1966 | Ziegler et al. . |
| 3,240,773 | 3/1966 | Boor, Jr. . |
| 3,260,708 | 7/1966 | Natta et al. . |
| 3,345,351 | 10/1967 | McCall et al. . |
| 3,371,079 | 2/1968 | Peters et al. . |
| 3,392,162 | 7/1968 | Ziegler et al. . |
| 3,394,118 | 7/1968 | Boor, Jr. . |
| 3,457,244 | 7/1969 | Fukuda et al. . |
| 3,535,269 | 10/1970 | Tanaka et al. . |
| 3,655,583 | 4/1972 | Yamamoto et al. . |
| 3,786,032 | 1/1974 | Jennings et al. . |
| 3,899,477 | 8/1975 | Altemore et al. . |
| 4,008,358 | 2/1977 | Abe et al. . |
| 4,063,009 | 12/1977 | Ziegler et al. . |
| 4,109,071 | 8/1978 | Berger et al. . |
| 4,154,701 | 5/1979 | Melquist . |
| 4,192,772 | 3/1980 | Berger et al. . |
| 4,202,958 | 5/1980 | Yamaguchi et al. . |
| 4,256,865 | 3/1981 | Hyde et al. . |
| 4,381,253 | 4/1983 | Shipley . |
| 4,383,119 | 5/1983 | Pullukat et al. . |
| 4,397,761 | 8/1983 | McDaniel et al. . |
| 4,426,317 | 1/1984 | Rogers . |
| 4,434,242 | 2/1984 | Roling et al. . |
| 4,435,518 | 3/1984 | Pennington et al. . |
| 4,435,519 | 3/1984 | Veazey et al. . |
| 4,435,520 | 3/1984 | Aylward . |
| 4,499,198 | 2/1985 | Pullukat et al. . |
| 4,508,842 | 4/1985 | Beran et al. . |
| 4,513,095 | 4/1985 | Speca . |
| 4,536,487 | 8/1985 | Speca . |
| 4,544,646 | 10/1985 | Pullukat et al. . |
| 4,559,318 | 12/1985 | Smith et al. . |
| 4,610,974 | 9/1986 | Speca . |
| 4,611,038 | 9/1986 | Brun et al. . |
| 4,618,595 | 10/1986 | Dietz ............................ 502/108 |
| 4,663,404 | 5/1987 | Invernizzi et al. . |
| 4,710,552 | 12/1987 | Bachl et al. . |
| 4,754,007 | 6/1988 | Pullukat et al. . |
| 4,810,761 | 3/1989 | Zoeckler et al. . |
| 4,812,432 | 3/1989 | Zoeckler et al. . |
| 4,831,090 | 5/1989 | Bachl et al. . |
| 4,866,021 | 9/1989 | Miro et al. . |
| 4,918,038 | 4/1990 | Samuels et al. . |
| 5,079,205 | 1/1992 | Canich . |

FOREIGN PATENT DOCUMENTS 1151140 8/1983 Canada .
1582287 1/1981 United Kingdom .

OTHER PUBLICATIONS

Karol, et al. (1988) "Developments with High-Activity Titanium, Vanadium, and Chromium Catalysts in Ethylene Polymerization" Kaminsky and Sinn (Eds), 141–161.

Smith, et al. (1985) "Bimetallic Halides, Crystal Structure of an Ethylene Polymerization by $VCL_2 \cdot ZnCl_2 \cdot 4THF$" Inorg. Chem. 24, 2997–3002.

Karol, et al. (1987) "Ethylene Polymerization with High Actvity Titanium, Vanadium and Chromium Catalysts" Book of Abstracts, 193rd ACS National Meeting, Denver, Colorado, Apr. 5–10, 1987.

Primary Examiner—Asok Pal
Attorney, Agent, or Firm—William A. Heidrich

[57] ABSTRACT

Catalysts useful in olefin polymerization are a mixture of (a) (i) one or more compounds $Zn(X^1)_2$ and one or more compounds $Al(R^1)_3$, or (ii) $Zn(X^1)_2 \cdot 2Al(R^1)_3$, wherein $X^1$ is halide and $R^1$ is $C_{1-12}$ hydrocarbyl; and (b) one or more of $V(X^2)_c(OR^2)_{b-c}$, $VO(X^3)_d(OR^3)_{3-d}$, or $VO(X^4)_2$, wherein $X^2$, $X^3$ and $X^4$ are halogen, $R^2$ and $R^3$ are $C_{1-18}$ hydrocarbyl, b is 3-4, c is 0-b, and d is 0-3; and can contain (c) one or more of $M(R^5)_e(X^5)_{3-e}$, $Al_2(R^5)_3(X^5)_3$ or $Mg(R^6)_fY_{2-f}$, wherein $X^1$ and $X^2$ are halide, $R^1$, $R^5$, $R^6$ and $R^9$ are $C_{1-12}$ hydrocarbyl, M is Al or B, e is 0-3, Y is halide, $O-(C_{1-12}$ hydrocarbyl) or $N(SiR^9_3)_2$, and f is 0-2.

29 Claims, No Drawings

VANADIUM BASED OLEFIN POLYMERIZATION CATALYST

BACKGROUND OF THE INVENTION

1. Field of the Invention

The present invention relates to vanadium-containing polymerization catalysts which are especially useful in low temperature, low pressure ethylene polymerization processes. The catalyst of the present invention produces polymers at a high level of catalyst activity. The catalysts of the present invention are designed to provide a high level of response to hydrogen as a molecular weight control agent. Compositionally, the catalysts of the present invention comprise compounds of zinc and vanadium. The present invention also relates to the polymerization process utilizing the catalysts and the polymers thus produced.

2. Description of the Prior Art

Vanadium-containing compositions have for some time been proposed for use in polymerization catalyst systems. Such catalysts, however, have had relatively little use on a commercial scale since the polymers produced therewith were produced at a relatively low level of catalyst activity and/or the catalysts produced polymer which had poor morphology and/or had the tendency to foul the reactor during polymerization. Accordingly, vanadium based catalyst systems have not achieved widespread use in polymerization—particularly olefin polymerization—as have titanium or chromium based catalysts. The development of commercially useful vanadium-containing polymerization catalysts has been particularly elusive despite the advantages attendant these systems, such as easier recovery and better handleability of the catalyst as well as greater control over the shade and size of the polymer particle and the overall superior quality of the polymer particle thus produced.

Examples of the development of supported vanadium based catalyst systems include: U.S. Pat. No. 3,786,032 which describes a catalyst used to polymerize vinyl and vinylidene halides, the catalyst being formed from an inert solid matrix, vanadium compounds and an organo-zinc complexed with an oxime. U.S. Pat. No. 4,559,318 discloses a vanadium dihalide complexed with an ether, such as tetrahydrofuran, and a zinc compound. The catalyst includes a porous support. U.S. Pat. No. 4,611,038 describes an olefin polymerization catalyst system prepared from a vanadium metal component, a porous support, and an organo-zinc compound; to yield the active solid hydrocarbon catalyst system, a controlled amount of prepolymerization takes place with this composition.

A more recent attempt to produce a high activity vanadium based catalyst composition which produces high density, high molecular weight alpha olefin polymers that have a relatively broad molecular weight distribution is described in U.S. Pat. No. 4,866,021. The catalyst system utilized therein incorporates supported vanadium, aluminum. and zinc compounds and further requires the presence of titanium.

SUMMARY OF THE INVENTION

The present invention is directed to a vanadium-containing polymerization catalyst. The catalyst is especially useful in low pressure, low temperature ethylenic and alpha-olefinic polymerization processes, such as ethylene homopolymerization or co-polymerization with, for example, 1-hexene.

The catalyst of the present invention also has a high level of response to hydrogen acting as a molecular weight control agent.

The catalyst of the present invention also produces a polymer, particularly an ethylene polymer, having a broad molecular weight distribution. The polymer thus produced has good particle morphology and high bulk density.

These objects are attained by using a catalyst composition which is the product formed by admixing one or more zinc-containing compositions of the formula $Zn(X^1)_2$ with one or more aluminum compositions corresponding to the formula $Al(R^1)_3$ wherein $X^1$ is a halide and $R^1$ is a straight or branched hydrocarbyl group having from 1 to 12 carbon atoms;

with one or a mixture of vanadium-containing compositions selected from the group consisting of compounds having the formula $V(X^2)_c(OR^2)_{b-c}$ where $X^2$ is halogen, $R^2$ is hydrocarbyl having 1 to about 18 carbon atoms, b is the valence of vanadium and is 3 or 4, and c is 0 or an integer from 1 to b; $VO(X^3)_d(OR^3)_{3-d}$ wherein $X^3$ is halogen, $R^3$ is hydrocarbyl having 1 to about 18 carbon atoms, and d is 0 or an integer from 1 to 3; $VO(X^4)_2$ wherein $X^4$ is halogen: and mixtures thereof.

An additional composition may also be incorporated into the catalyst to enhance or control catalyst activity, the response to hydrogen during the polymerization reaction and/or the molecular weight distribution of the polymer product.

An additional composition useful in this regard comprises one or a mixture of compounds selected from the group consisting of compounds having the general formula:

$M(R^5)_d(X^5)_{3-d}$, $Al_2(R^5)_3(X^5)_3$, or

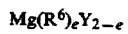

$Mg(R^6)_eY_{2-e}$ wherein M is aluminum or boron; $X^5$ is halide; $R^5$ is a hydrocarbyl group having from 1 to 12 carbon atoms; d is 0, 1, 2 or 3; $R^6$ is a hydrocarbon having from 1 to 12 carbon atoms; Y is halide or has the formula $OR^5$ where $R^8$ is $C_1$ to $C_{12}$ hydrocarbyl, or Y is a silyl amide having the formula $N(SiR^9_3)_2$ where $R^9$ is $C_1$ to $C_{12}$ hydrocarbyl; and e is 0, 1, or 2. A description of compounds conforming to this definition of Y is found in U.S. Pat. No. 4,383,119, the disclosure of which is hereby incorporated herein by reference.

Examples of particular additional compositions include boron alkyl halides—such as ethyl boron dichloride ($C_2H_5BCl_2$)—which function, for example, as molecular weight regulating agents; aluminum halides and aluminum alkyl halides—such as diethyl aluminum chloride (($C_2H_5$)AlCl) or ethyl aluminum dichloride ($C_2H_5AlCl_2$)—which function, for example, to enhance catalyst activity and polymer product properties.

Examples of other additional compositions include magnesium alkyl halides and magnesium alkyls—such as dibutyl magnesium ($C_4H_9$)$_2$Mg and butyl ethyl magnesium ($C_4H_9MgC_2H_5$)—and alkyl magnesium silyl amides, such as butyl magnesium bis trimethyl silyl amide ($C_4H_9MgN(Si(CH_3)_3)_2$), all of which function, for example, as molecular weight regulating agents.

In another aspect of the present invention, an olefin polymerization process is disclosed. In this process, olefins such as ethylene and/or one or more alpha-olefins are contacted with the above-identified vanadium-containing catalyst, and optionally a modifier, under polymerization conditions effective to obtain a homopolymer or copolymer. The olefin polymerization system of the present invention is useful in gas phase, slurry and solution polymerization processes and finds particular utility in producing ethylene homopolymers or copolymers with alpha-olefins, (including polar comonomers, such as vinyl chloride and vinyl alcohol), which polymers have high molecular weight and broad molecular weight distribution.

DETAILED DESCRIPTION OF THE INVENTION

Though not required in the practice of the present invention, a hydrocarbon solvent may be employed as a medium for the preparation of the instant catalyst. Non-polar solvents, e.g., alkanes—such as hexane and heptane, cycloalkanes and aromatics, are preferred. If a solvent is utilized, it is preferred that the solvent is dried in order to remove water. Drying in this regard may be accomplished by storage over molecular sieves.

In embodiments wherein a solvent is employed, it is preferred that the amount of solvent employed conform to a ratio of about 50 milliliters (mls) of solvent for about every 3 to 5 grams of catalyst. The solvent may be allowed to remain throughout preparation of the catalyst and can be removed by decantation, filtration or evaporation.

The catalyst of the present invention is the product obtained by admixing a zinc-containing composition, an aluminum-containing composition, and a vanadium-containing composition, as defined hereinbelow. It should be appreciated that no particular sequence of admixing is required, and that the present invention contemplates simultaneous admixing as well as any combination of sequential admixing. Although no particular sequence of admixing need be adhered to, a preferred embodiment of the present invention admixes the zinc-containing and aluminum-containing compositions first, followed by the vanadium-containing composition, the auxiliary composition, if any, and the modifier, if any.

Admixing preferably occurs at or about room temperature and at or about atmospheric pressure; thus no special heating or cooling, and no pressurization or vacuum are necessary, although these may be employed without detriment. If other than simultaneous admixing is employed, no specific time period need elapse between the addition of any one or more composition. If sequential admixing is utilized, however, it is preferred if about 30 minutes elapses between additions.

One preferred method comprises starting with a zinc-aluminum complex corresponding to the formula

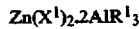

wherein $X^1$ is halogen and $R^1$ is a straight or branched hydrocarbyl having from 1 to 12 carbon atoms, preferably 1 to 6 carbon atoms. The $R^1$ is preferably alkyl, cycloalkyl, aryl, aralkyl, or alkaryl and more preferably is saturated. $X^1$ is preferably chlorine.

In the practice of the present invention, the zinc-aluminum complex may be formed by contacting a zinc halide with an aluminum alkyl. The invention is not limited to any particular ratio of the zinc-containing and aluminum-containing reactants, it being understood that those reactants preferentially form the complex at the indicated Zn:Al mole ratio of 1:2, with any excess of one or the other reactants remaining present. Preferably, the complex is formed by contacting about one mole of zinc chloride with about two moles of triethylaluminum; the formula of this particular zinc complex is $ZnCl_2.2Al(C_2H_5)_3$. Other preferred zinc-aluminum complexes include $ZnCl_2.2Al(C_6H_{13})_3$, and $ZnCl_2.2Al(C_4H_9)_3$, in the latter the butyl preferably being isobutyl. The complex-forming step preferably occurs separately, before contact with other material which optionally may be employed in forming the catalyst composition, but can occur upon addition of sufficient quantities of the zinc halide and the aluminum alkyl to slurried admixtures already containing other components of the catalyst, thus forming the zinc-aluminum complex in situ. The complex thus formed in either case is soluble in non-polar solvents, such as heptane.

The zinc-aluminum complex appears to result in a satisfactorily broad molecular weight distribution for the polymer, while exhibiting a desired level of activity for the catalyst. The use of the zinc-aluminum complex, in any event, is found to be more cost effective in the overall production of the catalyst system.

The vanadium-containing compositions useful in the preparation of the catalyst of the present invention include those which correspond to the formula

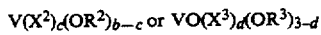

where $X^2$ and $X^3$ are halogen, preferably chlorine; $R^2$ and $R^3$ separately denote straight or branched hydrocarbyl having from 1 to about 18 carbon atoms, b is the valence of vanadium and is 3 or 4, and c is zero or an integer from b and d denotes 0, 1, 2 or 3. Vanadium-containing compositions useful in the present invention also include those having the formula $VO(X^4)_2$ wherein $X^4$ is halogen, preferably chloride. Mixtures of compounds corresponding to any of these formulas are acceptable. The $R^2$ and $R^3$ groups preferably have 2 to 6 carbon atoms and each is alkyl, aryl, cycloalkyl, aralkyl, or alkaryl, and more preferably is saturated. Examples of preferred compounds represented by these formulas include $VCl_3$, $VCl_4$, $VOCl_2$, $VOCl_3$, $VO(isopropyl)_3$ and one or a mixture of vanadyl lower alkoxy (i.e. $C_{1-6}$) halides such as vanadyl chloride butoxides.

An additional, or auxiliary, composition may, optionally, be incorporated into the admixture to enhance or control polymer and/or catalytic properties.

Useful auxiliary compositions include those represented by the general formulas

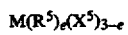

or

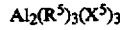

where M is aluminum or boron, $R^5$ represents straight or branched hydrocarbyl having from 1 to 12 carbon atoms; $X^5$ is halogen, preferably chlorine, and e is 0, 1, 2 or 3. Mixtures of compounds corresponding to the foregoing formulas are also useful. The $R^5$ group preferably has 2 to 6 carbon atoms and is preferably alkyl, cycloalkyl, aryl, aralkyl, or alkaryl, and more preferably is saturated. Examples of preferred auxiliary compositions having this general formula include diethyl aluminum chloride (($C_2H_5$)$_2$AlCl), ethyl aluminum dichloride ($C_2H_5$AlCl$_2$) ethyl boron dichloride ($C_2H_5$BCl$_2$), and boron trichloride (BCl$_3$).

It should be noted that compounds of the formula Zn(R$^3$)$_2$ are also useful auxiliary compositions.

Other auxiliary compositions useful in the reaction product admixture are magnesium bearing compositions corresponding to the formula $$MgR^6{}_fY_{2-f}$$

where R$^6$ is hydrocarbyl having from 1 to 12 carbon atoms; Y is halogen, or has the formula OR$^5$ where R$^5$ is hydrocarbyl containing 1 to 12 carbon atoms, of Y is a silyl amide having the formula N(SiR$^9{}_3$)$_2$ where R$^9$ is hydrocarbyl having from 1 to 12 carbon atoms and f is 0, 1 or 2. Preferably, R$^6$, R$^6$ and R$^9$ have 2 to 6 carbon atoms and are alkyl, cycloalkyl, aryl, aralkyl, or alkaryl, and more preferably are saturated. Y is preferably chlorine. Examples of such suitable auxiliary compounds include dibutyl magnesium (($C_4H_9$)$_2$Mg), butyl ethyl magnesium ($C_4H_9$MgC$_2$H$_5$) and butyl magnesium bis trimethyl silyl amide ($C_4H_9$MgN(Si(CH$_3$)$_3$)$_2$ also known as BMSA).

Mixtures of auxiliary compounds may also be used in the practice of the invention.

The amount of auxiliary composition, when utilized, is about 1:30 to about 300:1 (mole:mole) based on the amount of vanadium present. Most preferably, the amount is between about 1:2 to about 2:1. The auxiliary composition may be introduced into the admixture at any point in the sequence of preparation. Thus, for example, the auxiliary compounds may be introduced before or after the zinc and/or vanadium component. The auxiliary compounds are, in any event, preferably introduced into the admixture as a solution in a nonpolar hydrocarbon solvent. Alkanes, such as hexane or heptane, are preferred although cycloalkanes and aromatics may also be used. Mixtures of such solvents may also be provided.

The product obtained by the admixture described herein represents a first catalyst component which can be combined with a co-catalyst to form an active polymerization catalyst system. A co-catalyst useful in the practice of this aspect of the present invention includes, e.g., a metal alkyl, metal alkyl hydride, metal alkyl halide, or metal alkyl alkoxide, where the metal is aluminum, boron, zinc, or magnesium and the alkyl has 1 to 12 carbon atoms, preferably 2 to 6 carbon atoms. Mixtures of such co-catalysts, may be used with the catalyst composition. Aluminum trialkyls are preferred, with triethylaluminum and/or tri-isobutyl-aluminum especially preferred. Additional examples of co-catalysts include boron tri($C_{1-6}$) alkyls such as B($C_2H_5$)$_3$, zinc di($C_{1-6}$) alkyls such as Zn($C_2H_5$)$_2$, and magnesium di($C_{1-6}$) alkyls such as $C_4H_9$—Mg—$C_2H_5$.

The co-catalyst, when present, is present in an amount that corresponds to a ratio of co-catalyst to vanadium-containing composition of about 1:1 to 1000:1, preferably about 5:1 to about 100:1, and more preferably about 20:1 to 50:1. The vanadium-containing catalyst and the co-catalyst may be added continuously to the polymerization reactor during the course of the polymerization to maintain the desired ratio, or concentration.

In addition, during the course of polymerization, a modifier for the vanadium based catalyst system may be fed into the reactor. The modifier functions to make the vanadium more active. Surprisingly, although this effect of increased activity is true for vanadium, the modifier may nevertheless poison other transition metals, if any are present in the catalyst system of the instant invention.

Modifiers, sometimes referred to as "promoters" in the art, are typically chosen for their ability to increase and maintain the reactivity of vanadium catalyst, and also affect melt index and melt index ratio (MIR), which is a measure of molecular weight distribution.

Useful modifiers include halogenating agents such as those of the formula $M^2H_iX_{j-i}$ wherein $M^2$ is Si, C, Ge or Sn (preferably Si or C, and most preferably C), X is halogen (preferably Cl or Br and most preferably Cl), i is 0, 1, 2 or 3, and j is the valence of $M^2$. Such modifiers are disclosed in Miro, et al. U.S. Pat. No. 4,866,021 (Sep. 12, 1989), the disclosure of which is incorporated herein by reference. Modifiers of this type include chloroform, carbon tetrachloride, methylene chloride, dichlorosilane, trichlorosilane, silicon tetrachloride, and halogenated hydrocarbons containing 1 to 6 carbon atoms such as those available from E. I. dupont de Nemours & Co. under the trade designation Freon (e.g., Freon 11 and Freon 113).

Bachl, et al. U.S. Pat. No. 4,831,090 (May 16, 1989), the disclosure of which is incorporated herein by reference, discloses several classes of organohalogen compounds which are useful as modifiers. These include saturated aliphatic halohydrocarbons, olefinically unsaturated aliphatic halohydrocarbons, acetylenically unsaturated aliphatic halohydrocarbons, aromatic halohydrocarbons, and olefinically unsaturated halogenated carboxylates.

Particularly preferred modifiers are halocarbon compounds of the formula $R^6{}_kCX_{4-k}$ wherein R$^6$ is hydrogen or an unsubstituted or halogen substituted saturated hydrocarbon having from 1 to 6 carbon atoms; X is halogen and k is 0, 1 or 2. Examples of these halocarbon compounds include fluoro-, chloro-, or bromo- substituted ethane or methane compounds having at least two halogens attached to the carbon atom. Especially preferred modifiers include CCl$_4$, CH$_{2l}$ $_{Cl2}$, CBr$_4$, CH$_3$CCl$_3$, CF$_2$ClCCl$_3$, with the most especially preferred being CHCl$_3$ (chloroform), CFCl$_3$ (Freon 11) and CFCl$_2$CCF$_2$Cl (Freon 113). Mixtures of any of these modifiers may be used.

Selection of modifiers can be used to adjust polymer properties, sometimes at the expense of activity.

Preferred polymer properties may be obtained with a chosen modifier at a ratio of modifier to transition metal which is a compromise to maximum catalyst activity. The product molecular weight distribution and response of melt index to the presence of hydrogen are tunable by choice and concentration of modifier. Activity, melt index ratio (MIR), high load melt index (HLMI), etc. all vary with the ratio of modifier to transition metal, and with the choice of modifier.

The modifier utilized, when it is utilized, is present in an amount that corresponds to a ratio of modifier to vanadium-containing composition of 0.1:1 to about 1000:1 (mole:mole), preferably about 1:1 to about 100:1, and more preferably about 5:1 to about 50:1.

After the zinc-containing, aluminum-containing and vanadium-containing compositions are admixed, with any desired additional components, the catalyst product thus obtained can be recovered. If a solvent has been used, the solvent is preferably removed by e.g. decantation, filtration or evaporation. If evaporation is employed, it is preferred that a nitrogen purge at a temperature of about 100° C. be utilized.

It should be appreciated that each step of the preparation of the catalyst of the present invention is preferably carried out in an inert atmosphere, such as a nitrogen atmosphere. Further, in preparing the catalyst of the invention, it is desirable that the admixing is conducted under conditions that are substantially free of oxygen. Thus in a preferred embodiment no more than 100 ppm of oxygen, based on the weight of the gaseous atmosphere, is present during catalyst preparation. More preferably, no more than 10 ppm of oxygen is present, and most preferably, no more than 1 ppm of oxygen is present, based on the weight of the gaseous atmosphere. It is also desirable that the admixing is conducted under conditions that are substantially free of water. Thus in a preferred embodiment, no more than 150 ppm by weight of water, based on the weight of the admixture, is present during catalyst preparation. More preferably, no more than 10 ppm by weight of water, and most preferably no more than about 1 ppm by weight of water is present, based on the weight of the admixture.

To prepare the catalyst of the present invention, the zinc-containing, aluminum-containing and vanadium-containing compositions are preferably admixed after having been formed separately, although they may be formed in situ. The amount of zinc relative to the amount of vanadium is about 1:30 to about 300:1 (mole:-mole), preferably about 1:17 to about 30:1, and more preferably about 1:2 to about 2:1.

The polymerization reaction may be conducted under solution, slurry or gas phase conditions, at temperatures of about 50° C. up to about 250° C., preferably about 50° C. to about 110° C., and more preferably about 65° C. to about 105° C. Suitable pressures are about ambient to 30,000 psi, preferably about ambient to about 1000 psi and more preferably about ambient to about 700 psi.

The polymer obtained by the process of the present invention may be a homopolymer of ethylene, a homopolymer of an alpha-olefin, a copolymer of two or more alpha-olefins, or a copolymer of one or more alpha-olefins and ethylene, said alpha-olefins, as this term is used in this specification, having 3 to 12 carbon atoms. Alpha-olefins particularly useful in the present invention include propylene, 1-butene, 1-pentene, 1-hexene, 1-octene, 1,3-butadiene and 1,5-hexadiene.

The operator may in accordance with known techniques feed controlled amounts of $H_2$ into the reaction at the beginning of the polymerization, during it, or both, to control or modify the molecular weight of the polymer product.

The polymer thus produced can have a melt index (MI) at 190° C. and 2.16 kg (as measured by ASTM D1238-82) as high as up to about 1000, including a melt index as low as about 0.01 or less. The melt index ratios (HLMI/MI) of the polymer capable of being produced will vary depending on the above parameters of HLMI and MI; for example, the HLMI/MI can be between about 25 and about 150. The melt-index ratio correlates to molecular weight distribution (MWD). The term "HLMI" as used herein means the high load melt index as measured at 190° C. and 21.6 kg in accordance with ASTM D1238-82.

With either of the cocatalyst and modifier ratios, however, departure from the preferred values results in diminished activity and changes in polymer properties, i.e., MI and MIR. How these properties change differs with different catalyst components of the invention. Polymer properties may be tuned by varying cocatalyst and modifier levels, sometimes with a compromise of activity in order achieve desired properties.

The catalysts of the present invention are also notable in that their utilization does not require the presence of a support material, such as silica or other customary catalyst supports.

The catalysts of the present invention are also advantageous in that they provide to the user the ability tailor the properties of the polymer that is desired. The vanadium present affords sensitivity to the presence of hydrogen added to control of the molecular weight of the polymer. Higher polymer molecular weights are associated with higher strength, whereas lower molecular weights tend to be associated with greater processability. The catalyst of this invention allows one to achieve essentially any desired balance of strength and processability.

The polymers produced by the catalysts of the present invention do not require polymer de-ashing to be commercially acceptable in low ash polymer applications.

The catalyst systems of the present invention may be readily used under solution, slurry, or gas phase polymerization conditions.

The following examples are merely illustrative of the scope of the present invention and are not intended as a limitation therein.

EXAMPLE 1

This example demonstrates the preparation of a complex corresponding to the formula $ZnCl_2.2Al(CH_2CH_3)_3$. To a dry, empty Fisher-Porter bottle in a dry box were added 46.96 grams of $ZnCl_2$ followed by 440 ml of a 1.56 molar solution of triethyl aluminum which was added through a cannula. The bottle was heated to 90° C. for 1 hour and then allowed to cool to room temperature. Inspection two days later revealed a clear solution with a dark precipitate at the bottom, which was recovered by filtration. The complex was used without any further purification. The solution was understood to have a zinc concentration of about 0.34 molar and an aluminum concentration of about 0.69 molar. The concentration of the $ZnCl_2.2Al(CH_2CH_3)_3$ complex was assumed to be 0.34 molar.

EXAMPLE 2

A mixture of vanadium compounds was prepared by the following chemical reaction: $VOCl_3 + 1.5 (C_4H_9OH) = VO(OC_4H_9)_2Cl + VO(OC_4H_9)Cl_2 + VO(OC_4H_9)_3 + HCl$.

This example demonstrates the preparation of the vanadium compounds.

9.42 ml of $VOCl_3$ (density 1.84 g/ml) was stirred together with 13.73 ml of butyl alcohol (density 0.810 g/ml). Then, 76.9 ml of heptane was added to make up a 1 molar solution corresponding to the stoichiometric representation $VOCl_{1.5}(OC_4H_9)_{1.5}$. The solution was sparged with low flow $N_2$ for 5 minute to remove any HCl gas produced by the above-depicted reaction.

EXAMPLE 3

This example demonstrates the preparation of a catalyst composition of the present invention.

To a dry, empty 3-neck flask equipped with a magnetic stirring bar was added 15 ml (15 mM in V) of a solution prepared in accordance with Example 2 and 50 ml of heptane. The contents were held at 70° C. Then 38.5 ml (13.1 mM in Zn and Al) of a solution of a complex of $ZnCl_2.Al(C_2H_5)_3$ prepared in accordance with Example 1, which had been heated to 70° C., was added dropwise over a 1-hour period with stirring of the contents of the flask. Heat and smoke were generated by the addition. A slurry formed which, at the end of the addition of the zinc complex, was washed three times with 150 ml of heptane, decanted, filtered and dried.

EXAMPLE 4

All preparations of the catalysts and chemicals described herein to prepare the catalysts were carried out under a nitrogen atmosphere. Typically a 3 neck round bottom flask fitted with a paddle type stirrer was used for the catalyst preparations. Some of the chemical reactions to prepare the chemical precursors were prepared in Fisher Porter bottles.

Catalyst Run A:

To the round bottom flask was added 15 ml of the 1.0M solution of the Vanadium compounds whose preparation was described in Example 2.

Next 50 mls of heptane were added.

With good stirring the following was added dropwise to the flask: 38.5 mls of a 0.34M solution of the [Zn-Al] complex whose preparation was described in Example 1. The flask was then stirred for about 60 min. at ambient temperature and then filtered and washed 3 times with 150 mls each time of heptane. The catalyst was isolated by vacuum drying.

Catalyst Run B:

Using equipment equivalent to that described above, and

| | |
|---|---|
| $VOCl_3$ 1.0M, | 10 mls |
| Heptane | 50 mls |
| Zn—Al complex | 25.6 mls |
| $VO(OiPr)_3$ 1.0M, | 10 mls |

The 25.6 mls of the solution of Zn—Al complex whose preparation was described in Example 1 was added dropwise to a solution of 1 mole of $VOCl_3$ in 60 ml of heptane, while the flask was kept cool in a beaker of water at $-20°$ C. A precipitate formed; the reaction mixture was stirred 60 minutes at ambient temperature. Next 10 mls of 1.0M $VO(OiPr)_3$ solution was added slowly (iPr=isopropyl). The product was stirred 30 minutes at ambient temperature. The solid was allowed to settle and was filtered. The catalyst was washed 3 times with 150 mls each time of heptane. The catalyst was filtered and dried under vacuum.

Catalyst Run C:

To the 3 neck round-bottom flask fitted with a mechanical stirrer was added in the following order:

$ZnCl_2.2AlEt_3$, 12.9 ml (10 mM);
Heptane, 50 ml;
$VO(OiPr)_3$ 1M, 10 ml (10 mM);
$ZnEt_2$ 1.0M, 10 ml;
$VOCl_3$ 1M, 10 ml The vanadium solution was added dropwise to form a brown precipitate. This mixture was stirred for 30 min at ambient conditions, then 10 ml of $ZnEt_2$ (1M = 10 mM) was added followed by 10 ml of 1.0M $VOCl_3$ solution (dropwise).

The catalyst was stirred 30 min at ambient temperature then allowed to settle. The catalyst was filtered and washed three time with 150 mls each time of heptane. The final catalyst was obtained by vacuum drying.

EXAMPLE 5

The catalysts of Runs A, B and C in Example 4, prepared as described above, were each used to homopolymerize ethylene under slurry polymerization conditions in a slurry polymerization reactor. Each of the polymerization reactions was conducted in 600 milliliters of isobutane at a temperature of about 93.3° C. or 80° C. and a total pressure adjusted to yield the ethylene concentrations noted in the following tables. The reactions were each conducted for about 60 minutes. Ethylene concentration in isobutane was about 4–20 mole percent and was maintained at this level at all times of the polymerization reaction by the constant feeding of ethylene into the reactor. About 40 milligrams of catalyst was used in each polymerization example.

The catalyst and a catalyst modifier (chloroform, Freon 113) were injected into the reactor at full reactor pressure, that is, pressure from $H_2$, isobutane and ethylene. About 0.5 milliliters of an aluminum alkyl cocatalyst (triethyl aluminum or triisobutyl aluminum) was syringed into the reactor for each experiment as a 25 weight percent solution thereof in heptane. The mole ratio of hydrogen to ethylene ($C=_2$) used in the experiments was either 0.077:1 or 0.155:1. The mole ratio of modifier ($CHCl_3$), when used, to vanadium-containing composition $$\left( \frac{modifier}{V} \right)$$

was either 20:1 or 50:1. The mole ratio of cocatalyst to vanadium-containing composition $$\left( \frac{Al}{V} \right)$$

ranged from 5:1 to 25:1, respectively.

Tables 1–3, below, show the mole ratios of the various materials that were used and the results that were obtained therewith in terms of catalyst reactivity (grams polyethylene/grams of total catalyst per hour of reaction time), the melt index (MI), and melt index ratio (MIR= HLMI/MI) of the polymer products relative to the particular catalyst system used.

Hydrogen was added to the reactor from a vessel of known volume (about 150 ml); the amount of hydrogen added was measured as $\Delta P$, the change (decrease) in the hydrogen pressure in that vessel, measured in psi.

TABLE 1

| | | Catalyst from Example 4, Run A | | | | | |
|---|---|---|---|---|---|---|---|
| Test No. | Temp. °C. | Mole % $C_2H_4$ | $H_2$ ($\Delta P$) | Modifier | Reactivity | MI | MIR |
| 1 | 93.3 | 7 | 40 | None | 2,200 | 1.33 | 52. |
| 2 | 80. | 10 | 25 | $CHCl_3$ | 15,800 | 0.12 | 78. |
| 3 | 93.3 | 4 | 25 | $CHCl_3$ | 9,400 | 0.23 | 74. |
| 4 | 93.3 | 4 | 25 | Freon 113 | 6,000 | 0.46 | 66. |

Test No. 1 demonstrates that the catalyst in accordance with the present invention exhibits good reactivity even without the use of a modifier. The polymer product had a narrower molecular weight distribution than that obtained in Tests 2–4.

Test No. 2 demonstrates that the catalyst in accordance with the present invention exhibits very high reactivity when used with $CHCl_3$ as a modifier.

Test No. 3 demonstrates that the catalyst of the present invention exhibits very high activity even at very low ethylene concentrations.

Test No. 4 demonstrates that the catalyst of the present invention exhibits good activity using a different modifier (Freon 113, which is $CF_2ClCCl_2F$).

Tests 1–4 show that the present invention affords the operator the ability to tailor the molecular weight distribution to desired values via straightforward adjustments of conditions and feed materials.

TABLE 2

| | | Catalyst from Example 4, Run B | | | | |
|---|---|---|---|---|---|---|
| Test No. | Temp. °C. | Mole % $C_2H_4$ | $H_2$ ($\Delta P$) | Modifier | Reactivity | MI | MIR |
| 5 | 93.3 | 4 | 40 | $CHCl_3$ premixed w/TIBAL | 3,400 | 5.10 | 68. |
| 6 | 93.3 | 7 | 75 | $CHCl_3$ | 11,430 | 2.63 | 68. |

Tests 5 and 6 demonstrate that preparing the catalyst of the present invention with two distinct vanadium-containing feed materials still provided catalyst exhibiting very good activity that produced polymers of medium to broad molecular weight distribution (as evidenced by the MIR values).

TABLE 3

| | | Catalyst from Example 4, Run C | | | | |
|---|---|---|---|---|---|---|
| Test No. | Temp. °C. | Mole % $C_2H_4$ | $H_2$ ($\Delta P$) | Modifier | Reactivity | MI | MIR |
| 7 | 93.3 | 4 | 40 | $CHCl_3$ | 4,880 | 0.81 | 73. |
| 8 | 93.3 | 4 | 40 | Freon 113 | 2,330 | 0.92 | 60. |
| 9 | 80. | 10 | 40 | $CHCl_3$ | 5,400 | 2.71 | 62. |

Tests 7–9 demonstrated catalysts according to the present invention having high reactivity. Comparison of Tests 1–9 demonstrates the ability to adjust the MI higher or lower, as desired, as well as broader or narrower molecular weight distribution (as measured by the MIR), with reaction conditions including the choice of modifier. The catalysts of the present invention surprisingly exhibit desirably high reactivity even at higher hydrogen concentrations.

What is claimed is:

1. An unsupported catalyst consisting essentially of the product produced by admixing:
   (a) (i) one or more zinc-containing compositions corresponding to the formula $Zn(X^1)_2$ and one or more aluminum-containing compositions corresponding to the formula $Al(R^1)_3$; or
   (ii) a composition of the formula $Zn(X^1)_2 \cdot 2Al(R^1)_3$; wherein $X^1$ is a halide, and wherein $R^1$ is a hydrocarbyl group having from 1 to about 12 carbon atoms; and
   (b) a vanadium composition selected from the group consisting of compounds having the formula $V(X^2)_c(OR^2)_{b-c}$ wherein $X^2$ is halogen, $R^2$ is hydrocarbyl having 1 to about 18 carbon atoms, b is the valence of vanadium and is 3 or 4 and c is 0 or an integer from 1 to b; $VO(X^3)_d(OR^3)_{3-d}$ wherein $X^3$ is halogen, $R^3$ is hydrocarbyl having 1 to about 18 carbon atoms, and d is 0 or an integer from 1 to 3; $VO(X^4)_2$ wherein $X^4$ is halogen and mixtures thereof.

2. An unsupported catalyst consisting essentially of the product produced by admixing:
   (a) (i) one or more zinc-containing compositions corresponding to the formula $Zn(X^1)_2$ and one or more aluminum-containing compositions corresponding to the formula $Al(R_1)_3$; or
   (ii) a composition of the formula $Zn(X^1)_2 \cdot 2Al(R^1)_3$; wherein $X^1$ is a halide, and wherein $R^1$ is a hydrocarbyl group having from 1 to about 12 carbon atoms;
   (b) a vanadium composition selected from the group consisting of compounds having the formula $V(X^2)_c(OR^2)_{b-c}$ wherein $X^2$ is halogen, $R^2$ is hydrocarbyl having 1 to about 18 carbon atoms, b is the valence of vanadium and is 3 or 4 and c is 0 or an integer from 1 to 3; $VO(X^3)_d(OR_3)_{3-d}$ where $X^3$ is halogen, $R^3$ is hydrocarbyl having 1 to about 18 carbon atoms, and d is 0 or an integer from 1 to 3; $VO(X^4)_2$ wherein $X^4$ is halogen, and mixtures thereof; and
   (c) one or more additional compositions selected from the group consisting of compounds having the formula $M(R^5)_e X^5_{3-e}$ or $Al_2(R^5)_3 X^5_3$ wherein M is Al or B, $X^5$ is a halide, $R^5$ is a hydrocarbyl group having from 1 to about 12 carbon atoms, and e is 0, 1, 2 or 3; and compounds having the formula $Mg(R^6)_f Y_{2-f}$ wherein $R^6$ is a hydrocarbyl group having from 1 to about 12 carbon atoms, Y is a halide or has the formula $OR^8$ where $R^8$ is hydrocarbyl having from 1 to about 12 carbon atoms, or Y is a silyl amide having the formula $—N(SiR^9_3)_2$ wherein $R^9$ is hydrocarbyl having from 1 to about 12 carbon atoms, and f is 0, 1 or 2.

3. The catalyst of claim 1 wherein $R^1$ is alkyl, cycloalkyl, aryl, aralkyl, alkaryl or mixtures thereof.

4. The catalyst of claim 3 wherein $R^1$ is alkyl having 1 to 6 carbon atoms.

5. The catalyst of claim 4 wherein $R^1$ is $—C_2H_5$.

6. The catalyst of claim 5 wherein $X^1$ is chloride.

7. The catalyst of claim 6 wherein said vanadium-containing composition is selected from the group consisting of $VCl_3$, $VCl_4$, $VOCl_2$, $VOCl_3$, $VO(iOC_3H_7)_3$ and mixtures thereof.

8. The catalyst of claim 1 wherein $X^1$ is chloride.

9. The catalyst of claim 1 wherein $R^2$ and $R^3$ are selected from the group consisting of alkyl, cycloalkyl, aryl, aralkyl and alkaryl.

10. The catalyst of claim 9 wherein $R^2$ and $R^3$ are alkyl having 1 to 6 carbon atoms.

11. The catalyst of claim 10 wherein $X^2$, $X^3$ and $X^4$ are chloride.

12. The catalyst of claim 1 wherein X2, $X^3$ and $X^4$ are chloride.

13. The catalyst of claim 1 wherein said vanadium-containing composition is selected from the group consisting of $VCl_3$, $VCl_4$, $VOCl_2$, $VOCl_3$, $VO(iOC_3H_7)_3$ and mixtures thereof.

14. The catalyst of claim 2 wherein $R^5$, $R^6$, $R^8$ and $R^9$ are alkyl, cycloalkyl, aryl, aralkyl or alkaryl.

15. The catalyst of claim 14 wherein $R^5$, $R^6$, $R^8$ and $R^9$ are alkyl having 1 to 6 carbon atoms.

16. The catalyst of claim 2 wherein $X^5$ is chloride.

17. The catalyst of claim 2 wherein said additional composition is selected from the group consisting of $(C_2H_5)_2AlCl$, $C_2H_5AlCl_2$, $(C_2H_5)_3Al_2Cl_3$, $(C_4H_9)_2Mg$, $Zn(C_2H_5)_2$, $C_4H_9H_5Mg$, $C_2H_5BCl_2$, $BCl_3$, $C_4H_9MgN(Si(CH_3)_3)_2$ and mixtures thereof.

18. The catalyst of claim 1 wherein said product is substantially free of titanium.

19. An unsupported olefin polymerization catalyst system consisting of
   A. a catalyst consisting essentially of the product produced by admixing:
      (a) (i) one or more zinc-containing compositions corresponding to the formula $Zn(X^1)_2$ and one or more aluminum-containing compositions corresponding to the formula $Al(R^1)_3$; or
      (ii) a composition of the formula $Zn(X^1)_2 \cdot 2Al(R^1)_3$; wherein $X^1$ is a halide, and wherein $R^1$ is a hydrocarbyl group having from 1 to about 12 carbon atoms, and
      (b) a vanadium composition selected from the group consisting of compounds having the formula $V(X^2)_c(OR^2)_{b-c}$ wherein $X^2$ is halogen, $R^2$ is hydrocarbyl having 1 to about 18 carbon atoms, b is the valence of vanadium and is 3 or 4 and c is 0 or an integer from 1 to 3; $VO(X^3)_d(OR^3)_{3-d}$ wherein $X^3$ is halogen, $R^3$ is hydrocarbyl having 1 to about 18 carbon atoms, and d is 0 or an integer from 1 to 3; $VO(X^4)_2$ wherein $X^4$ is halogen, and mixtures thereof; and
   B. a co-catalyst wherein the co-catalyst is a metal alkyl, metal alkyl hydride, metal alkyl halide, or metal alkyl alkoxide.

20. The olefin polymerization catalyst system claim 19 wherein the metal is aluminum, boron, zinc, or magnesium.

21. The olefin polymerization catalyst system claim 19 wherein the alkyl has 1 to 12 carbon atoms.

22. The olefin polymerization catalyst system of claim 19 wherein the alkyl has 2 to 6 carbon atoms.

23. The olefin polymerization catalyst system claim 19 wherein the co-catalyst is triethyl alumina, triisobutyl aluminum, or a mixture thereof.

24. The olefin polymerization catalyst system claim 19 wherein the ratio of metal in the co-catalyst to vanadium in the catalyst is about 1:1 to about 1000:1.

25. An unsupported polymerization catalyst system consisting essentially of
   A. a catalyst consisting essentially of the product produced by admixing:
      (a) (i) one or more zinc-containing compositions corresponding to the formula $Zn(X^1)_2$ and one or more aluminum-containing compositions corresponding to the formula $Al(R^1)_3$; or
      (ii) a composition of the formula $Zn(X^1)_2Al(R^1)_3$; wherein $X^1$ is a halide, and wherein $R^1$ is a hydrocarbyl group having from 1 to about 12 carbon atoms; and
      (b) a vanadium composition selected from the group consisting of compounds having the formula $V(X^2)_c(OR^2)_{b-c}$ wherein $X^2$ is halogen, $R^2$ is hydrocarbyl having 1 to about 18 carbon atoms, b is the valence of vanadium and is 3 or 4 and c is 0 or an integer from 1 to b; $VO(X^3)_d(OR^3)_{3-d}$ wherein $X^3$ is halogen, $R^3$ is hydrocarbyl having 1 to about 18 carbon atoms, and d is 0 or an integer from 1 to 3; $VO(X^4)_2$ wherein $X^4$ is halogen, and mixtures thereof; and
   B. a co-catalyst wherein the co-catalyst is a metal alkyl, metal alkyl hydride, metal alkyl halide, or metal alkyl alkoxide; and
   C. a modifier wherein the modifier corresponds to the formula $$M^2H_iX_{j-1}$$

wherein $M^2$ is Si, C, Ge or Sn, X is halogen, i is 0, 1, 2 or 3, and j is the valence of $M^2$.

26. The olefin polymerization catalyst system of claim 25 wherein said modifier corresponds to the formula $R^6_kCX_{4-k}$ wherein $R^6$ is hydrogen or an unsubstituted or halogen substituted hydrocarbon having 1 to 6 carbon atoms; X is halogen; and k is 0, 1 or 2.

27. The olefin polymerization catalyst system claim 25 wherein the modifier is $CCl_4$, $CH_2Cl_2$, $CBr_4$, $CH_3CCl_3$, $CF_2ClCCl_3$, $CHCl_3$, $CFCl_3$, $CFCl_2CF_2Cl$, or mixtures thereof.

28. An unsupported olefin polymerization catalyst system consisting essentially of
   A. a catalyst comprising the product produced by admixing:
      (a) (i) one or more zinc-containing compositions corresponding to the formula $Zn(X^1)_2$ and one or more aluminum-containing compositions corresponding to the formula $Al(R_1)_3$; or
      (ii) a composition of the formula $Zn(X^1)_2 \cdot 2Al(R^1)_3$; wherein $X^1$ is a halide, and wherein $R^1$ is a hydrocarbyl group having from 1 to about 12 carbon atoms;
      (b) a vanadium composition selected from the group consisting of compounds having the formula $V(X^2)_c(OR^2)_{b-c}$ wherein $X^2$ is halogen, $R^2$ is hydrocarbyl having 1 to about 18 carbon atoms, b is the valence of vanadium and is 3 or 4 and c is 0 or an integer from 1 to b; $VO(X^3)_d(OR_3)_{3-d}$ where $X^3$ is halogen, $R^3$ is hydrocarbyl having 1 to about 18 carbon atoms, and d is 0 or an integer from 1 to 3; $VO(X^4)_2$ wherein $X^4$ is halogen, and mixtures thereof; and
      (c) one or more additional compositions selected from the group consisting of compounds having the formula $$M(R^5)_eX^5_{3-e} \text{ or } Al_2(R^5)_3X^5_3$$

wherein M is Al or B, $X^5$ is a halide, $R^5$ is a hydrocarbyl group having from 1 to about 12 carbon atoms, and e is 0, 1, 2 or 3; and compounds having the formula $$Mg(R^6)_fY_{2-f}$$

wherein $R^6$ is a hydrocarbyl group having from 1 to about 12 carbon atoms, Y is a halide or has the formula $OR^8$ where $R^8$ is hydrocarbyl having from 1 to about 12 carbon atoms, or Y is a silyl amide having the formula $-N(SiR^9_3)$ wherein $R^9$ is hydrocarbyl having from 1 to about 12 carbon atoms, and f is 0, 1 or 2; and
   B. a co-catalyst wherein the co-catalyst is a metal alkyl, metal alkyl hydride, metal alkyl halide, or metal alkyl alkoxide.

29. An unsupported olefin polymerization catalyst system consisting essentially of
   A. a catalyst comprising the product produced by admixing:
      (a) (i) one or more zinc-containing compositions corresponding to the formula $Zn(X^1)_2$ and one or more aluminum-containing compositions corresponding to the formula $Al(R^1)_3$;

(ii) a composition of the formula $Zn(X^1)_2 \cdot 2Al(R^1)_3$; wherein $X^1$ is a halide, and wherein $R^1$ is a hydrocarbyl group having from 1 to about 12 carbon atoms;

(b) a vanadium composition selected from the group consisting of compounds having the formula $V(X^2)_c(OR^2)_{b-c}$ wherein $X^2$ is halogen, $R^2$ is hydrocarbyl having 1 to about 18 carbon atoms, b is the valence of vanadium and is 3 or 4 and c is 0 or an integer from 1 to b; $VO(X^3)_d(OR_3)_{3-d}$ where $X^3$ is halogen, $R^3$ is hydrocarbyl having 1 to about 18 carbon atoms, and d is 0 or an integer from 1 to 3; $VO(X^4)_2$ wherein $X^4$ is halogen, and mixtures thereof; and (c) one or more additional compositions selected from the group consisting of compounds having the formula $$M(R^5)_e X^5_{3-e} \text{ or } Al_2(R^5)_3 X^5_3$$

wherein M is Al or B, $X^5$ is a halide, $R^5$ is a hydrocarbyl group having from 1 to about 12 carbon atoms, and e is 0, 1, 2 or 3; and compounds having the formula $$Mg(R^6)_f Y_{2-f}$$

wherein $R^6$ is a hydrocarbyl group having from 1 to about 12 carbon atoms, Y is a halide or has the formula $OR^8$ where $R^8$ is hydrocarbyl having from 1 to about 12 carbon atoms, or Y is a silyl amide having the formula $-N(SiR^9_3)_2$ wherein $R^9$ is hydrocarbyl having from 1 to about 12 carbon atoms, and f is 0, 1 or 2;

B. a co-catalyst wherein the co-catalyst is a metal alkyl, metal alkyl hydride, metal alkyl halide, or metal alkyl alkoxide; and C. a modifier wherein the modifier corresponds to the formula $$M^2 H_i X_{j-i}$$

wherein $M^2$ is Si, C, Ge or Sn, X is halogen, i is 0, 1, 2 or 3, and j is the valence of $M^2$.

* * * * *

UNITED STATES PATENT AND TRADEMARK OFFICE
CERTIFICATE OF CORRECTION

PATENT NO. : 5,374,597          Page 1 of 2

DATED : December 20, 1994

INVENTOR(S) : Chi-I Kuo, et al

It is certified that error appears in the above-indentified patent and that said Letters Patent is hereby corrected as shown below:

Col. 12,

Claim 2, line 18, "3", first instance, should read ---b---.

Col. 13,

Claim 19, line 18, "3", first instance, should read ---b---.

Claim 20, line 1, ---of--- should be inserted before "claim".

Claim 21, line 1, ---of--- should be inserted before "claim".

Claim 23, line 1, ---of--- should be inserted before "claim".

Claim 23, line 2, "alumina" should read ---aluminum---.

Claim 24, line 1, ---of--- should be inserted before "claim".

Claim 25, line 9, "$Zn(X^1)_2Al(R^1)_3$" should read ---$Zn(X^1)_2 2Al(R^1)_3$---.

UNITED STATES PATENT AND TRADEMARK OFFICE
CERTIFICATE OF CORRECTION

PATENT NO. : 5,374,597

DATED : December 20, 1994

INVENTOR(S) : Chi-I Kuo, et al

It is certified that error appears in the above-indentified patent and that said Letters Patent is hereby corrected as shown below:

Column 14,

Claim 27, line 1, ---of--- should be inserted before "claim".

Claim 28, line 57, "—N(SiR$^9_3$)" should read ----—N(SiR$^9_3$)$_2$---.

Column 15,

Claim 29, line 8, ---or--- should be inserted before "(ii)".

Signed and Sealed this

Sixteenth Day of May, 1995

BRUCE LEHMAN

*Commissioner of Patents and Trademarks*